Figure 1:
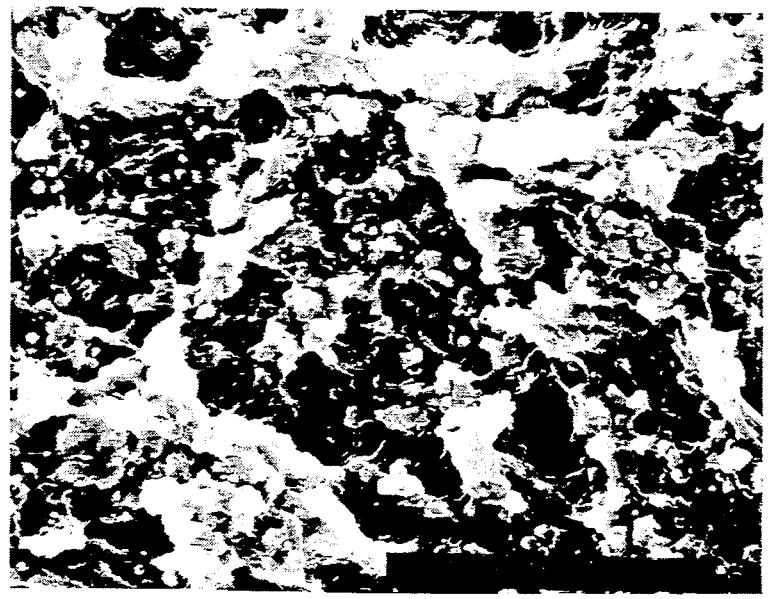

United States Patent [19]

Nishio et al.

[11] Patent Number: 5,262,478
[45] Date of Patent: Nov. 16, 1993

[54] COMPOSITION OF POLYPHENYLENE ETHER, POLYAMIDE, MODIFIED COPOLYMER RUBBER AND EPOXY COMPOUND

[75] Inventors: Taichi Nishio; Takashi Sanada; Satoru Hosoda, all of Chiba, Japan

[73] Assignee: Sumitomo Chemical Company, Ltd., Japan

[21] Appl. No.: 965,522

[22] Filed: Oct. 23, 1992

Related U.S. Application Data

[60] Continuation of Ser. No. 312,666, Feb. 21, 1989, abandoned, which is a division of Ser. No. 12,323, Feb. 9, 1987, abandoned.

[30] Foreign Application Priority Data

Feb. 13, 1986 [JP] Japan ................................ 61-29797

[51] Int. Cl.$^5$ .................... C08L 23/16; C08L 71/04; C08L 77/02; C08L 77/06
[52] U.S. Cl. ........................................ 525/68; 525/65; 525/66; 524/504
[58] Field of Search ................ 525/65, 66, 68, 92, 525/132

[56] References Cited

U.S. PATENT DOCUMENTS

| | | | |
|---|---|---|---|
| 4,315,086 | 2/1982 | Ueno et al. | 525/391 |
| 4,339,376 | 7/1982 | Kasahara et al. | 525/66 |
| 4,454,284 | 6/1984 | Ueno et al. | 525/92 |
| 4,550,130 | 10/1985 | Kishida et al. | 525/65 |
| 4,600,741 | 7/1986 | Aycock et al. | 525/68 |

FOREIGN PATENT DOCUMENTS

| | | | |
|---|---|---|---|
| 0009757 | 4/1980 | European Pat. Off. | 525/66 |
| 0024120 | 2/1981 | European Pat. Off. . | |
| 0055473 | 7/1982 | European Pat. Off. . | |
| 0236596 | 9/1987 | European Pat. Off. . | |
| 3600366 | 7/1987 | Fed. Rep. of Germany | 525/66 |

Primary Examiner—Robert E. Sellers
Attorney, Agent, or Firm—Cushman, Darby & Cushman

[57] ABSTRACT

A thermoplastic resin composition suitable for shaped articles comprises (A) 100 parts by weight of a composition consisting of (a) from 5-95% by weight of a polyphenylene ether and (b) from 95-5% by weight of a polyamide, (B) from 5-100 parts by weight of a reactive group-modified copolymer rubber, and (C) from 0.01-30 parts by weight of a copolymer of unsaturated epoxy compound/ethylene/(/ethylenically unsaturated compound).

9 Claims, 3 Drawing Sheets

10μ

|—————|
10μ

10μ

COMPOSITION OF POLYPHENYLENE ETHER, POLYAMIDE, MODIFIED COPOLYMER RUBBER AND EPOXY COMPOUND

This is a continuation of application No. 07/312,666, filed on Feb. 21, 1989, which was a continuation of application Ser. No. 07/012,323 filed Feb. 9, 1987, both now abandoned.

This invention relates to a novel thermoplastic resin composition suitable for shaped articles, sheet or film by injection molding or extrusion molding. More particularly, it relates to a novel thermoplastic resin composition superior in heat resistance, mechanical properties and processability, which contains modified rubber substances and epoxy compounds in a resin composition of polyphenylene ether and polyamide.

Polyphenylene ether is thermoplastic resin superior in various mechanical properties, heat resistance, electrical properties, chemical resistance, hot water resistance, flame resistance and dimension stability, but inferior in processability due to high melt viscosity and relatively inferior in impact resistance.

A composite material comprising polyphenylene ether and polystyrene is proposed in order to lessen melt viscosity of polyphenylene ether and to improve processability thereof, leaving various other good properties thereof unchanged. However, such inherent good properties of polyphenylene as heat resistance, flame resistance and chemical resistance are somewhat damaged when enough polystyrene is added to provide processability practically workable. No sufficient improvement is seen in impact resistance, either, even after polystyrene is added.

Polyamide is inferior in processability and impact resistance, absorbs too much water and encounters greatly large changes in various properties and in dimension during the practical use, although it is thermoplastic resin superior in heat resistance, rigidity, strength and oil resistance. Improvement in these difficulties has been desired.

Another composite material comprising polyphenylene ether and polyamide is proposed in order to possess good properties of the both resins and to improve processability and impact resistance. However, polyphenylene ether is poor compatible with polyamide because their melt viscosities are greatly far from each other. Simple blending encounters the following difficulties, for example;

1. hardness in stable take-up of strands extruded and greatly lower processability in injection molding, because their melt viscosity difference is very large; and
2. no improvement in mechanical properties, particularly in impact resistance, but rather lower than expected on the basis of their respective values.

One approach to resolve the problems is the use of additives which are reactive or compatible with polyphenylene ether and/or polyamide (Japanese patent publications (Kokoku) 60-11966, (Kokai) 56-47432, 57-10642, 60-58463). Additives proposed in Japanese patent publications (Kokoku) 60-11966 and (Kokai) 56-47432 are somewhat effective but no desired improvement is obtained in impact resistance. There is limitation in their use. Another approach is the use of modified polystyrene or polyphenylene ether together with additives reactive to rubber (Japanese patent publications (Kokai) 56-49753, 57-10642, 57-165448 and 59-66452). However, this approach is not satisfactory yet, either, because it brings about unbalance between impact resistance and heat resistance and furthermore no desired improvement is obtainable in impact resistance. Their use is also restricted from a practical point of view.

We have found that addition of a modified rubber substance as well as epoxy compound to a composition of polyphenylene ether and polyamide provides a resin composition having good balance between heat resistance and impact resistance and having superior impact resistance.

According to the present invention, a thermoplastic resin composition is provided by blending (A), (B) and (C) defined below:

(A): 100 parts by weight of a resin composition comprising a) and b) defined below:

a) being 5-95% by weight of polyphenylene ether obtained by oxidation polymerization of at least one phenol represented by the formula:

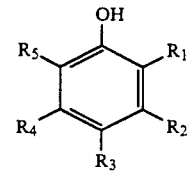

wherein $R_1$, $R_2$, $R_3$, $R_4$ and $R_5$ represent a hydrogen atom, a halogen atom or a substituted or unsubstituted hydrocarbon residue and at least one of them is a hydrogen atom, and b) being 95-5% by weight of polyamide, (B): 5-100 parts by weight of a modified rubber substance and (C): 0.01-30 parts by weight of epoxy compound.

Figure 2:
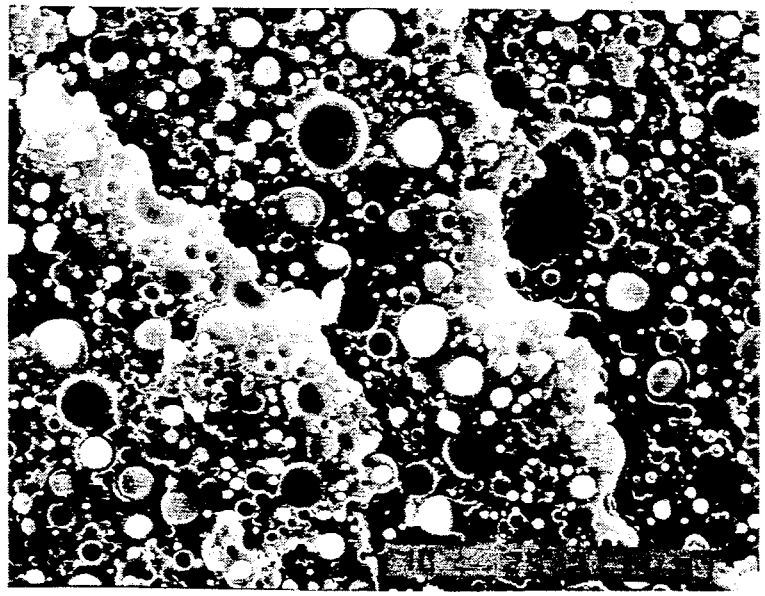
Figure 3:
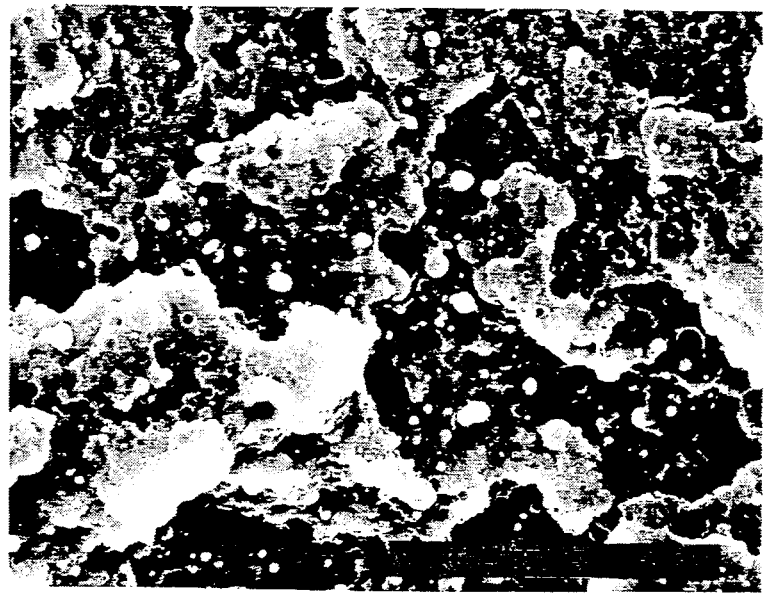

In the accompanying drawings, FIGS. 1-3 are photographs ($\times 1500$) under a scanning electron microscope of fracture plane of test pieces of example 1, comparison example 1 and comparison example 2, respectively, after Izod impact strength tests are over.

Polyphenylene ether resin (a) is polymer obtained by oxidation polymerization of one or more of phenol compounds having the formula:

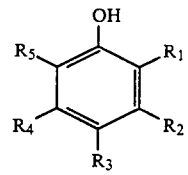

wherein $R_1$, $R_2$, $R_3$, $R_4$ and $R_5$ represent a hydrogen atom, a halogen atom or a hydrocarbon residue substituted or not and at least one of them is a hydrogen atom, with molecular oxygen or gas containing the same in the presence of a oxidation coupling catalyst.

Examples of $R_1$–$R_5$ are a hydrogen atom, a chlorine atom, a bromine atom, a fluorine atom, an iodine atom, a methyl group, an ethyl group, an n- or iso-propyl group, a pri.-, sec.- or tert.-butyl group, a chloroethyl group, a hydroxyethyl group, a phenylethyl group, a benzyl group, a hydroxymethyl group, a carboxyethyl group, a methoxycarbonylethyl group, a cyanoethyl group, a phenyl group, a chlorophenyl group, a methylphenyl group, a dimethylphenyl group, an ethylphenyl group or an allyl group.

Examples of phenol compound are phenol, o-, m- or p-cresol, 2,6-, 2,5-, 2,4- or 3,5-dimethylphenol, 2-methyl-6-phenylphenol, 2,6-diphenylphenol, 2,6-diethylphenol, 2-methyl-6-ethylphenol, 2,3,5-, 2,3,6- or 2,4,6-trimethylphenol, 3-methyl-6-t. butylphenol, thymol and 2-methyl-6-allylphenol.

Alternatively, copolymers of any of the phenol compound listed above and the other phenol compound, for example, polyhydroxy aromatic compound, may be employed. The polyhydroxy aromatic compound is, for example, bisphenol A, tetrabromobisphenol A, resorcin, hydroquinone and novolack resin.

Preferably polymers are homopolymer of 2,6-dimethylphenol or 2,6-diphenylphenol and copolymers of a large amount of 2,6-dimethylphenol and a small amount of 3-methyl-6-t-butylphenol or of 2,3,6-trimethylphenol.

An oxidation coupling catalyst employed for oxydation polymerization of phenol compound is not critical. Any catalyst may be used as long as it has polymerization ability. Examples are cuprous compound/tert. amine such as cuprous chloride/triethylamine and cuprous chloride/pyridine; cupric compound/amide/alkali metal hydroxide such as cupric chloride/pyridine/potassium hydroxide; manganese salt/primary amine such as manganese chloride/ethanolamine and manganese acetate/ethylenediamine; manganese salt/alcolate or phenolate such as manganese chloride/sodium methylate and manganese chloride/sodium phenolate; and cobalt salt/tert. amine.

Polymerization temperature for preparing polyphenylene ether is 40° C. or higher (high temperature polymerization) or lower (low temperature polymerization). Either temperature may be used, although polymers produced thereby have different properties.

Polyphenylene ether further includes that grafted with styrenic polymer or other polymer. For instance, grafted one is obtained by graft-polymerizing styrene monomer and/or other comonomer in the presence of polyphenylene ether and organic peroxide (Japanese patent publications (Kokoku) 47-47862, 48-12197, 49-5623, 52-38596 and 52-30991) or by melt-kneading polyphenylene ether and polystyrene in the presence of a radical initiator.

Polyamide resin (b) is one obtained by condensation-polymerization of three or more membered lactam, polymerizable ω-amino acid, or dibasic acid/diamine. Examples are, for example, polymers of ε-caprolactam, aminocaproic acid, enantholactam, 7-aminoheptanoic acid or 11-aminoundecanoic acid; and polymers or copolymers of diamine/dicarboxylic acid, said diamine being, for example, hexamethylenediamine, nonamethylenediamine, undecamethylenediamine, dodecamethylenediamine and methaxylylenediamine and said dicarboxylic acid being, for example, terephthalic acid, isophthalic acid, adipic acid, sebacic acid, dodecanedioic acid and glutaric acid.

Examples of polyamide are aliphatic polyamide, for example, polyamide 6, polyamide 6.6, polyamide 6.10, polyamide 11, polyamide 12, and polyamide 6.12; and aromatic polyamide, for example, polyhexamethylenediamine terephthalamide, polyhexamethylenediamine isophthalamide, xylene group-containing polyamide. Polyamide may be used singly or in the blended form or copolymer form.

Blending ratio in (A) between (a) polyphenylene ether and (b) polyamide is 5-95% by weight of the former and 95-5% by weight of the latter.

When an amount of polyamide is less than 5% by weight, an improvement in solvent resistance and in processability is small. When an amount of polyamide is more than 95% by weight, thermal properties such as heat deformation temperature are degraded.

A modified rubber substance (B) is obtained by modifying a rubber substance such as a natural or synthetic polymeric substance which is elastic at room temperature. Examples of the rubber substance are natural rubber, butadiene homopolymer, random, block or grafted butadiene/styrene copolymer, isoprene homopolymer, chlorobutadiene homopolymer, butadiene/acrylonitrile copolymer, isobutylene homopolymer, isobutylene/butadiene copolymer, isobutylene/isoprene copolymer/acrylic ester copolymer, ethylene/propylene copolymer, ethylene/propylene/diene copolymer, "Thiocol" (trade name) rubber, polysulfide rubber, polyurethane rubber, polyether rubber such as polypropylene oxide and epichlorhydrine rubber.

Any rubber substance may be used, no matter how it is prepared, for example, emulsion polymerization or solution polymerization, what catalyst is used, for, example, peroxide, trialkylaluminium, lithium halide or nickel, how much crosslinking degree is, what ratio of microstructure is, for example, cis, trans, vinyl group; and how much average rubber particle size is. So far as copolymer is concerned, any of random, block and graft may be used.

Preferable rubber substance is ethylene/propylene copolymer and styrene copolymer.

Modification of the rubber substance above is copolymerization of the rubber substance and at least one of comonomers listed below, no matter which copolymerization is effected, random, block or graft. Comonomer is selected from compounds having a carboxyl group, an acid anhydride group, an acid amido group, an amino group or a hydroxyl group and oxazolines, which are reactive or compatible with polyamide, polyphenylene ether and epoxy compound.

Examples of the comonomer are maleic anhydride, maleic acid, fumaric acid, maleimide, maleic acid hydrazide, a reaction product of maleic anhydride and diamine, e.g., compounds having the formulas

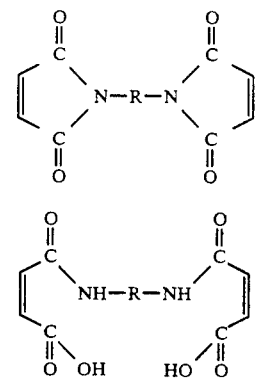

wherein R is an aliphatic or aromatic group, methylnadic anhydride, dichloromaleic anhydride, maleic acid amide and, natural fats and oils such as soybean oil, tung oil, castor oil, linseed oil, hempseed oil, cottonseed oil, sesame oil, rapeseed oil, peanut oil, camellia oil, olive oil, coconut oil and sardine oil; unsaturated carboxylic acid such as acrylic acid, butenoic acid, crotonic acid, vinyl acetic acid, methacrylic acid, pentenoic acid, angelic acid, tiglic acid, 2-pentenoic acid, 3-pentenoic acid, α-ethylacrylic acid, β-methylcrotonic acid, 4-pentenoic acid, 2-hexenoic acid, 2-methyl-2-pentenoic acid, 3-methyl-2-pentenoic acid, α-ethylcrotonic acid, 2,2-dimethyl-3-butenoic acid, 2-heptenoic acid, 2-octenoic acid, 4-decenoic acid, 9-undecenoic acid, 10-undecenoic acid, 4-dodecenoic acid, 5-dodecenoic acid, 4-tetradecenoic acid, 9-tetradecenoic acid, 9-hexadecenoic acid, 2-octadecenoic acid, 9-octadecenoic acid, eicosenoic acid, docosenoic acid, erucic acid, tetracocenoic acid, mycolipenic acid, 2,4-pentadienic acid, 2,4-hexadienic acid, diallyl acetic acid, geranic acid, 2,4-decadienic acid, 2,4-dodecadienic acid, 9,12-hexadecadienic acid, 9,12-octadecadienic acid, hexadecatrienic acid, linolic acid, linolenic acid, octadecatrienic acid, eicosadienic acid, eicosatrienic acid, eicosatetraenic acid, ricinoleic acid, eleostearic acid, oleic acid, eicosapentaenic acid, erucic acid, docosadienic acid, docosatrienic acid, docosatetraenic acid, docosapentaenic acid, tetracosenoic acid, hexacosenoic acid, hexacodienoic acid, octacosenoic acid, and tetraaconitic acid; ester, acid amide or anhydride of unsaturated carboxylic acid above; unsaturated oxazoline; unsaturated alcohol such as allyl alcohol, crotyl alcohol, methylvinyl carbinol, allyl carbinol, methylpropenyl carbinol, 4-penten-1-ol, 10-undecene-1-ol, propargyl alcohol, 1,4-pentadiene-3-ol, 1,4-hexadiene-3-ol, 3,5-hexadiene-2-ol, 2,4-hexadiene-1-ol, alcohol of the formula: $C_nH_{2n-5}OH$, $C_nH_{2n-7}OH$ or $C_nH_{2n-9}OH$ (n is an integer), 3-buten-1,2-diol, 2,5-dimethyl-3-hexene-2,5-diol, 1,5-hexadiene-3,4-diol or 2,6-octadiene-4,5-diol; and unsaturated amine such as that where an OH group of the unsaturated alcohol is replaced by an —NH₂ group.

Preferable comonomer is acrylic acid or maleic anhydride.

The modified rubber substance (B) is used in such an amount as 5–100 parts by weight every 100 parts by weight of the composition (A). When an amount of (B) is less than 5 parts by weight, no sufficient improvement is obtained in impact strength, and when the amount is more than 100 parts by weight, no good balance between heat resistance and the other properties is obtained. Preferable amount of (B) is 10–80 parts by weight within the range above.

Epoxy compound (C) includes epoxy resin and epoxy group-containing copolymer. Examples are bis-phenol A epoxy resin, O-cresol novolac epoxy resin, glycidylamine epoxy resin, three-functional epoxy resin and four-functional epoxy resin. The epoxy compound further includes a composition containing a reactive diluent.

Epoxy group-containing copolymer includes, for example, unsaturated epoxy compound/ethylenically unsaturated compound copolymer, epoxidized polyester and epoxidized polyamide. Unsaturated epoxy compound used for the unsaturated epoxy compound/ethylenically unsaturated compound copolymer has in a molecule both an epoxy group and an unsaturated group which is copolymerizable with the ethylenically unsaturated compound, for instance, unsaturated glycidyl ester and unsaturated glycidyl ether having the formula (1) and (2) below:

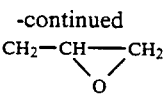 (1)

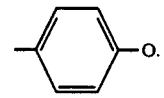 (2)

wherein R is a C₂–C₁₈ hydrocarbon group containing ethylenically unsaturated bond and X is —CH₂—O— or

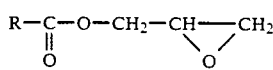

Examples are glycidyl acrylate, glycidyl methacrylate, glycidyl itaconate, allylglycidyl ether, 2-methylallyl glycidyl ether, styrene-p-glycidyl ether. The ethylenically unsaturated compound is olefin, vinyl ester of C₂–C₆ saturated carboxylic acid, C₁–C₈ saturated alcohol/acrylic or methacrylic acid ester, maleate, methacrylate, fumarate, halogenated vinyl, styrene, nitrile, vinyl ether or acrylamide. Examples are ethylene, propylene, butene-1, vinyl acetate, methyl acrylate, ethyl acrylate, methyl methacrylate, diethyl malate, diethyl fumarate, vinyl chloride, vinylidene chloride, styrene, acrylonitrile, isobutyl vinyl ether and acrylamide. They are used singly or in a mixture of at least two of them. Ethylene is preferable most of all.

Composition ratio in the epoxy group-containing copolymer is not critical, but 0.1–50% by weight, more preferably 1–30% by weight of unsaturated epoxy compound is preferred.

The epoxy group-containing copolymer is prepared by various methods. Either random copolymerization or graft copolymerization may be effected; in the former, unsaturated epoxy compound is introduced in backbone chain of copolymer, and in the latter, unsaturated epoxy compound is introduced in side chain of copolymer. Examples are copolymerization in which unsaturated epoxy compound is allowed to react with ethylene in the presence of a radical initiator under 500–4000 atm. at 100°–300° C. in the presence or absence of a solvent and a chain transfer agent; graft copolymerization in which polypropylene, unsaturated epoxy compound and a radical initiator are blended and allowed to melt in an extruder and copolymerization in which unsaturated epoxy compound is allowed to react with ethylenically unsaturated compound in an inert solvent such as water or an organic solvent in the presence of a radical initiator.

Unsaturated epoxy compound/ethylenically unsaturated compound copolymer is preferable, particularly, unsaturated epoxy compound/ethylene or other ethylenically unsaturated compound than ethylene.

The epoxy compound (C) is blended in such an amount as 0.01–30 parts by weight, preferably 0.01–20 parts by weight every 100 parts by weight of a composition (A) containing polyphenylene ether (a) and polyamide (b). When an amount of the epoxy compound is less than 0.01 parts by weight, an improvement is poor, while when an amount thereof is more than 30 parts by weight, more gelation proceeds and processability is degraded.

The present composition may be used in such a form as a composite material reinforced with such fibers as glass fibers, carbon fibers, polyamide fibers or metal whiskers; or a composite material wherein inorganic fillers or flame retardants such as silica, alumina, calcium carbonate, talc, mica, carbon black, $TiO_2$, ZnO or $Sb_2O_3$; lubricants; nuclear agents; plasticizers; dyes; pigments; antistatic agents; antioxidants; and/or weatherability providing agents are added.

Any process is used to prepare the present resin composition.

Melt-blending methods for the components are the best from an economical point of view, although it is possible to blend the components in a solution and evaporate the solvent or precipitate in a non-solvent. Melt-blending is carried out in a single-screw or a twin-screw extruder, a kneader or so, preferably a high-speed twin-screw extruder.

Before kneading, it is preferable to blend powder or pellets of the component resins in a tumbler or a Henschel mixer. The first blending above is not always necessary. Alternatively, each resin may be fed to a kneader through a metering apparatus. Resin composition, after kneaded, is molded according to injection, extrusion and the like. Alternatively, dry blending the resin materials at the injection or extrusion molding without, pre-kneading and direct kneading are made in the melt processing to produce a shaped article. Any order is used in the kneading step. Resins (A), (B) and (C) are kneaded together. Resins (A) and (B) are first kneaded before resin (C) is kneaded. However, it is not desirable to knead resins (B) and (C) and then add resin (A), because gelation occurs and desirable resin composition is not produced.

The present invention is explained referring to examples below. Surface hardness, Heat distortion temperature (which is abbreviated as H.D.T.), Izod impact strength (3.2 mm thick) and melt index (M.I.) are observed in accordance with JIS K7202, JIS K7207, JIK K7110 and JIS K7210, respectively.

Polyphenylene ether, a modified rubber substance, and epoxy compound used in the examples and comparison examples are obtained below except that epoxy resin and polyamide commercially available are employed.

Polyphenylene Ether

Manganese chloride/ethylenediamine is added to a solution of 2,6-dimethylphenol in toluene and methanol and then the solution is subjected to oxydation polymerization under a molecular-oxygen atmosphere at 30° C. Intrinsic viscosity in chloroform is 0.55 dl/g.

Modified Rubber Substance

A mixture of ethylene/propylene rubber, maleic anhydride and t.-butyl peroxylaurate is fed in an extruder (screw diameter: 30 mm, L/D=28, barrel temperature: 230° C., screw rotation: 60 rpm) and extruded from a die to obtain strands which are then cooled in water to produce pellets.

Epoxy Compound

Glycidyl methacrylate/ethylene/vinyl acetate copolymer is prepared in accordance with Japanese patent publications (Kokai) 47-23490 and 48-11388. That is, glycidyl methacrylate, ethylene, vinyl acetate, a radical initiator and a chain transfer agent are successively fed in a reactor (40 l) made of stainless steel whose temperature is controllable and which is equipped with an inlet, an outlet and a stirrer, and copolymerization is effected under stirring under 1400-1600 atm. at 180°-200° C.

Epoxy Resin

"Sumiepoxy" ® ELM-434 manufactured by Sumitomo Chemical Company, Limited; 4-functional epoxy resin, epoxy equivalent=110-130 g/eq.

Polyamide

Polyamide 6.6: UBE Nylon ® 2020B manufactured by Ube Kosan Co. Ltd.

EXAMPLE 1

A resin composition (100 parts by weight) made from polyamide 6.6 (50% by weight, "UBE Nylon" ® 2020B) and polyphenylene ether (50% by weight), maleic anhydride-grafted rubber (11.4 parts by weight) and glycidyl methacrylate/ethylene/vinyl acetate copolymer (2.3 parts by weight) were melted and kneaded at 270° C. in a small batchwise twin-screw kneader ("Laboplastmil" ® manufactured by Toyo Seiki).

A composition obtained was pressed at 270° C. to prepare test pieces for Izod impact strength test and heat distortion temperature test.

Results are given in table 1 together with those of example 2 and of comparison examples 1, 2 and 3.

EXAMPLE 2

A resin composition (100 parts by weight) made from polyamide (50% by weight, "UBE Nylon" ® 2020B) and polyphenylene ether (50% by weight), maleic anhydride-grafted rubber (11.4 parts by weight) and an epoxy compound (2.3 parts by weight, "Sumiepoxy" ® ELM-434) were treated similar to Example 1.

COMPARISON EXAMPLE 1

Polyamide 6.6 (50% by weight, "UBE Nylon" ® 2020B) and polyphenylene ether (50% by weight) were melted and kneaded in the similar manner to that of example 1.

A composition obtained was pressed at 270° C. to prepare test pieces.

COMPARISON EXAMPLE 2

A resin composition (100 parts by weight) made from polyamide 6.6 (50 % by weight, "UBE Nylon" ® 2020B) and polyphenylene ether (50% by weight) and maleic anhydride-grafted rubber (11.4 parts by weight) were melted and kneaded in the similar manner to that of example 1 to prepare test pieces.

COMPARISON EXAMPLE 3

Comparison example 2 was repeated except that 42.9 parts by weight of maleic anhydride-grafted rubber was used in place of 11.4 parts by weight.

Table 1 shows that test pieces obtained in example 1 have better impact strength than those of comparison examples 1 and 2. In particular, impact strength of test pieces of example 1 is greatly higher than that of comparison example 2, even though heat resistance and surface hardness are substantially on the same levels, respectively. This fact is beyond expectation and this result owes to a small amount of epoxy compound added. Although it made a rule to use a larger amount of rubber in order to improve impact strength, comparison example 3 shows that such a usual practice rather greatly degrades heat resistance and hardness and lowers impact strength. In order to study the fact above, fracture planes after impact strength tests were over were observed by a scanning electron microscope. FIG.

1 shows that particles of polyphenylene ether resin are greatly stretched and all ingredients are uniformly compatible. This structure contributes to uniformly distribute strain against breakage, and brings about further microscopic elongation until impact strength is improved. FIG. 2 shows that ingredients are incompatible and particles of polyphenylene ether resin are clearly seen. In the Figure, black particles are residues from which resins have been escaped. FIG. 3 shows that compatibility of ingredients is better than FIG. 2 but is not satisfactory yet because some of circular peaks and valleys are seen.

Test pieces of example 1 and comparison examples 1 and 2 were melted and kneaded in a twin-screw kneader ("TEX".-® 44, Nihon Steel Manufacturing Co. Ltd.) to effect strand-cut test, respectively. Test pieces of comparison example 1 did not give strands, because melt-viscosity at a die was too low. Test pieces of example 1 and comparison example 2 gave strands without difficulty.

Example 2 gave higher impact strength and better balance among properties than comparison examples 1 and 2.

EXAMPLE 3

Example 1 was repeated except that 80 parts by weight of maleic anhydride-grafted rubber and 9.5 parts by weight of glycidyl methacrylate/ethylene/vinyl acetate copolymer were used in place of 11.4 and 2.3 parts, respectively.

Results are given in Table 2.

EXAMPLE 4

Example 1 was repeated except that 5.4 parts by weight of maleic anhydride-grafted rubber and 2.2 parts by weight of glycidyl methacrylate/ethylene/vinyl acetate copolymer were used in place of 11.4 and 2.3 parts, respectively.

Results are given in Table 2.

COMPARISON EXAMPLE 4

Example 1 was repeated except that 110 parts by weight of maleic anhydride-grafted rubber and 11 parts by weight of glycidyl methacrylate/ethylene/vinyl acetate copolymer were used in place of 11.4 and 2.3 parts, respectively.

Results are given in Table 2.

COMPARISON EXAMPLE 5

Example 1 was repeated except that 3.0 parts by weight of maleic anhydride-grafted rubber and 2.1 parts by weight of glycidyl methacrylate/ethylene/vinyl acetate copolymer were used in place of 11.4 and 2.3 parts, respectively.

Results are given in Table 2.

Table 2 shows that heat resistance and hardness are greatly damaged when an amount of maleic anhydride-grafted rubber is greater than 100 parts by weight and no remarkable improvement in impact strength is obtained when an amount of maleic anhydride-grafted rubber is smaller than 5 parts by weight.

EXAMPLE 5

Example 1 was repeated except that 0.6 part by weight of glycidyl methacrylate/ethylene/vinyl acetate copolymer was used in place of 2.3 parts by weight.

Results are given in Table 3.

EXAMPLE 6

Example 1 was repeated except that 28 parts by weight of glycidyl methacrylate/ethylene/vinyl acetate copolymer was used in place of 2.3 parts by weight.

Results are given in Table 3.

COMPARISON EXAMPLE 6

Example 1 was repeated except that 40 parts by weight of glycidyl methacrylate/ethylene/vinyl acetate copolymer was used in place of 2.3 parts by weight.

Results are given in Table 3.

Table 3 shows that gelation proceeds too much and balance among properties is degraded when an amount of epoxy compound is greater than 30 parts by weight.

As described above, polyamide is fully compatible with polyphenylene ether in the present resin composition, thereby impact strength is greatly improved without substantial degradation of heat resistance. In particular, high impact strength has hardly been provided in polyamide/polyphenylene ether. The present invention succeeds in dissolving the difficulty encountered and broadening the use of the composition. The present resin composition is thermoplastic and easily able to mold or shape by any procedures familiar to the skilled in the art, e.g., injection molding, extrusion molding, to obtain, for example, a sheet or a film having good balance among heat resistance, impact strength and hardness.

TABLE 1

| | (A) | | every 100 parts by weight of (A) | | | | | |
|---|---|---|---|---|---|---|---|---|
| | Polyphenylene either (a) (wt %) | Polyamide (b) (wt %) | Maleic anhydride grafted rubber (B) (parts by weight) | Epoxy compound (C) (parts by weight) | M.I. (g/10 min) 280° C. 2.16 Kg | Izod Impact notched (Kg · cm/cm$^2$) | H.D.T. (°C.) 18.6 Kg/cm$^2$ | Surface hardness (Rockwell) (R) |
| Example 1 | 50 | 50 | 11.4 | *2.3 | 0.3 | 20.1 | 153 | 113 |
| Example 2 | 50 | 50 | 11.4 | **2.3 | 0.1 | 17.8 | 144 | 110 |
| Comparison example 1 | 50 | 50 | — | — | 11.1 | 3.4 | 175 | 121 |
| Comparison example 2 | 50 | 50 | 11.4 | — | 1.3 | 13.0 | 152 | 108 |
| Comparison example | 50 | 50 | 42.9 | — | 1.8 | 7.9 | 51 | 42 |

TABLE 1-continued

| | (A) | | every 100 parts by weight of (A) | | | | | |
|---|---|---|---|---|---|---|---|---|
| | Poly-phenylene either (a) (wt %) | Poly-amide (b) (wt %) | Maleic anhydride grafted rubber (B) (parts by weight) | Epoxy compound (C) (parts by weight) | M.I. (g/10 min) 280° C. 2.16 Kg | Izod Impact notched (Kg · cm/cm²) | H.D.T. (°C.) 18.6 Kg/cm² | Surface hardness (Rockwell) (R) |
| 3 | | | | | | | | |

*Glycidyl methacrylate/ethylene/vinyl acetate copolymer
**Sumiepoxy ® ELM-434

TABLE 2

| | (A) | | every 100 parts by weight of (A) | | | | | |
|---|---|---|---|---|---|---|---|---|
| | Poly-phenylene either (a) (wt %) | Poly-amide (b) (wt %) | Maleic anhydride grafted rubber (B) (parts by weight) | *Epoxy compound (C) (parts by weight) | M.I. (g/10 min) 280° C. 2.16 Kg | Izod Impact notched (Kg · cm/cm²) | H.D.T. (°C.) 18.6 Kg/cm² | Surface hardness (Rockwell) (R) |
| Example 3 | 50 | 50 | 80 | 9.5 | 0.2 | 48 | 60 | 30 |
| Example 4 | 50 | 50 | 54 | 2.2 | 0.3 | 7 | 164 | 117 |
| Comparison example 4 | 50 | 50 | 110 | 11.0 | <0.1 | Not broken | 40 | 10 |
| Comparison example 5 | 50 | 50 | 3.0 | 2.1 | 8.0 | 43 | 170 | 118 |

*Glycidyl methacrylate/ethylene/vinyl acetate copolymer

TABLE 3

| | (A) | | every 100 parts by weight of (A) | | | | | |
|---|---|---|---|---|---|---|---|---|
| | Poly-phenylene either (a) (wt %) | Poly-amide (b) (wt %) | Maleic anhydride grafted rubber (B) (parts by weight) | *Epoxy compound (C) (parts by weight) | M.I. (g/10 min) 280° C. 2.16 Kg | Izod Impact notched (Kg · cm/cm²) | H.D.T. (°C.) 18.6 Kg/cm² | Surface hardness (Rockwell) (R) |
| Example 5 | 50 | 50 | 11.4 | 0.6 | 10.1 | 14.5 | 162 | 110 |
| Example 6 | 50 | 50 | 11.4 | 28 | 0.1 | 23.0 | 101 | 80 |
| Comparison example 6 | 50 | 50 | 11.4 | 40 | Gelled unable to observe | 10.0 | 75 | 72 |

*Glycidyl methacrylate/ethylene/vinyl acetate copolymer

We claim:

1. A thermoplastic resin composition consisting essentially of 100 parts by weight of a composition (A) defined below; 5–100 parts by weight of (B), a modified copolymer rubber selected from the group consisting of ethylene/propylene copolymer rubber and ethylene/propylene/diene copolymer rubber said copolymer rubber being modified with maleic anhydride; and 0.01–30 parts by weight of (C), a copolymer of unsaturated epoxy compound/ethylene or a copolymer of unsaturated epoxy compound/ethylene/ethylenically unsaturated compound other than ethylene, said unsaturated epoxy compound being selected from unsaturated glycidyl ester and unsaturated glycidyl ether having the formulas (1) and (2) below:

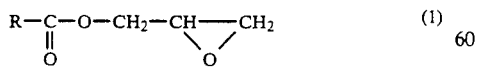

(1)

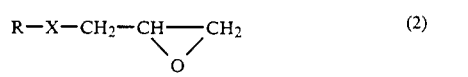

(2)

wherein R is a $C_2$–$C_{18}$ hydrocarbon group containing ethylenically unsaturated bond and X is —$CH_2$—O— or

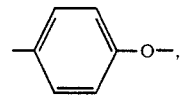

and said composition (A) consists of (a) 5–95% by weight of polyphenylene ether obtained by oxidation polymerization of at least one phenol compound of the formula:

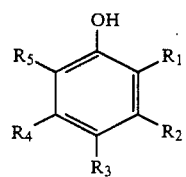

wherein $R_1$, $R_2$, $R_3$, $R_4$ and $R_5$ each represents a hydrogen atom, a halogen atom or a hydrocarbon residue substituted or not and at least one of $R_1$, $R_2$, $R_3$, $R_4$ and $R_5$ is a hydrogen atom, and (b) 95–5% by weight of polyamide.

2. A thermoplastic resin composition according to claim 1 wherein the polyphenylene ether (a) is homopolymer of 2,6-dimethylphenol or 2,6-diphenylphenol, or copolymer of a large amount of 2,6-dimethylphenol and a small amount of 3-methyl-6-t-butylphenol or 2,3,6-trimethylphenol.

3. A thermoplastic resin composition according to claim 1 wherein the polyamide (b) is a condensation-polymerization product of three or more membered lactam, ω-amino acid or a copolymer of a dicarboxylic acid and a diamine.

4. A thermoplastic resin composition according to claim 1, wherein the modified copolymer rubber (B) is ethylene/propylene copolymer rubber.

5. A thermoplastic resin composition according to claim 1 wherein an amount of the modified copolymer rubber (B) is 10-80 parts by weight every 100 parts by weight of the composition (A).

6. A thermoplastic resin composition according to claim 1 wherein (C) is a copolymer containing 0.1-50% by weight of unsaturated epoxy compound.

7. A thermoplastic resin composition according to claim 6 wherein an amount of unsaturated epoxy compound is 1-30% by weight.

8. A thermoplastic resin composition according to claim 1, wherein the amount of copolymer (C) is 0.01-20 parts by weight per 100 parts by weight of the composition (A).

9. A thermoplastic resin composition according to claim 1 wherein said resin composition is reinforced with inorganic fillers and/or flame retardants.

* * * * *